(12) United States Patent
Nellis

(10) Patent No.: US 12,329,072 B2
(45) Date of Patent: Jun. 17, 2025

(54) ADJUSTABLE TREE TRUNK GUARD

(71) Applicant: Mitchell Nellis, Rochester, NY (US)

(72) Inventor: Mitchell Nellis, Rochester, NY (US)

(\*) Notice: Subject to any disclaimer, the term of this patent is extended or adjusted under 35 U.S.C. 154(b) by 0 days.

(21) Appl. No.: 18/507,350

(22) Filed: Nov. 13, 2023

(65) Prior Publication Data

US 2024/0172604 A1 May 30, 2024

Related U.S. Application Data

(60) Provisional application No. 63/437,654, filed on Jan. 7, 2023, provisional application No. 63/428,782, filed on Nov. 30, 2022.

(51) Int. Cl.
*A01G 13/27* (2025.01)

(52) U.S. Cl.
CPC .................................... *A01G 13/27* (2025.01)

(58) Field of Classification Search
CPC .................................................. A01G 13/0237
See application file for complete search history.

(56) References Cited

U.S. PATENT DOCUMENTS

| 801,325 | A | | 10/1905 | Lichtfeldt | |
|---|---|---|---|---|---|
| 1,031,941 | A | | 7/1912 | Lanham | |
| 1,442,367 | A | * | 1/1923 | Stevens | A01G 13/0237 47/2 |
| 1,874,779 | A | | 8/1932 | McChensney, Sr. et al. | |
| 3,036,554 | A | * | 5/1962 | Johnson | A61D 9/00 119/815 |
| 4,584,789 | A | * | 4/1986 | Jean | A01G 13/0237 47/23.1 |
| 4,995,192 | A | * | 2/1991 | DeWid | A01G 13/0281 47/20.1 |
| 5,349,927 | A | * | 9/1994 | Campbell | A01K 13/006 119/815 |
| 5,479,741 | A | * | 1/1996 | Underwood | A01G 13/0237 47/32.4 |
| 5,797,354 | A | * | 8/1998 | Marschall | A61D 9/00 119/815 |
| 6,705,044 | B2 | | 3/2004 | Clancey | |
| D506,296 | S | * | 6/2005 | Driver | 119/815 |
| D562,505 | S | * | 2/2008 | Fujita | D30/152 |

(Continued)

FOREIGN PATENT DOCUMENTS

| CA | 2140160 A1 | * | 7/1996 |
|---|---|---|---|
| CH | 344256 A | * | 1/1960 |

(Continued)

*Primary Examiner* — Jessica B Wong
(74) *Attorney, Agent, or Firm* — Dawson Law Firm, P.C.; Michael J. Nickerson

(57) ABSTRACT

A tree trunk guard is being configured in a semi-circle shape. The tree trunk guard includes a minor semi-circle edge having a first minor semi-circle edge endpoint and a second minor semi-circle edge endpoint, a major semi-circle edge having a first major semi-circle edge endpoint and a second major semi-circle edge endpoint, a first edge configured to be positioned between the first minor semi-circle edge endpoint and the first major semi-circle edge endpoint, and a second edge configured to be positioned between the second minor semi-circle edge endpoint and the second major semi-circle edge endpoint.

10 Claims, 9 Drawing Sheets

(56) References Cited

U.S. PATENT DOCUMENTS

| | | | | |
|---|---|---|---|---|
| 8,296,995 | B1* | 10/2012 | Georges | A01G 13/0237 47/20.1 |
| 10,798,882 | B2 | 10/2020 | Paige, Sr. | |
| 2006/0254137 | A1* | 11/2006 | Lin | A01G 9/12 47/32.4 |
| 2009/0235581 | A1* | 9/2009 | Bevins | A01G 13/00 47/32.5 |
| 2009/0241855 | A1* | 10/2009 | Stocki | A61D 9/00 119/815 |
| 2012/0151836 | A1 | 6/2012 | Crook | |
| 2017/0231171 | A1 | 8/2017 | Emory | |
| 2017/0325423 | A1* | 11/2017 | McGrath | A01K 13/006 |
| 2020/0315762 | A1* | 10/2020 | Correa | A61D 9/00 |
| 2021/0227792 | A1* | 7/2021 | Winekoff | A01K 15/04 |
| 2022/0256780 | A1* | 8/2022 | Zhao | A47G 33/04 |

FOREIGN PATENT DOCUMENTS

| | | | |
|---|---|---|---|
| CH | 692464 A5 * | 7/2002 | ......... A01G 13/0237 |
| KR | 101310566 | 9/2013 | |
| KR | 20130104172 | 9/2013 | |
| KR | 20140069556 | 6/2014 | |
| KR | 101603872 | 3/2016 | |

\* cited by examiner

400

500

600

ADJUSTABLE TREE TRUNK GUARD

PRIORITY INFORMATION

This application claims priority from U.S. Provisional Patent Application Ser. No. 63/428,782, filed on Nov. 30, 2022. The entire content of U.S. Provisional Patent Application Ser. No. 63/428,782, filed on Nov. 30, 2022, is hereby incorporated by reference.

This application also claims priority from U.S. Provisional Patent Application Ser. No. 63/437,654, filed on Jan. 7, 2023. The entire content of U.S. Provisional Patent Application Ser. No. 63/437,654, filed on Jan. 7, 2023, is hereby incorporated by reference.

BACKGROUND

Tree trunks are often susceptible to damage caused by lawn care equipment, such as trimmers, and other similar activities.

One conventional solution to reducing damage to tree trunks is disclosed in Published US Patent Application Number 2012/0151836. The entire content of Published US Patent Application Number 2012/0151836 is hereby incorporated by reference.

As disclosed in Published US Patent Application Number 2012/0151836, FIG. 1 shows a tree guard circumscribing a portion of the trunk of a tree.

Referring to FIG. 1, tree guard 10 is formed around tree trunk 12 by plural arcuate panels, such as 14, 16, and 18, which circumscribe trunk 12. The arcuate panels are held in place by upper fastener assemblies such as upper fastener assembly 32 between adjacent panels 14 and 16, and upper fastener assembly 36 between adjacent panels 16 and 18. Lower fastener assemblies 34 and 38 perform a similar function with respect to panels 14, 16, and 18.

Arcuate panel 14 has an upper portion 20 that is positioned close to the trunk 12 and a unitary, outwardly flared skirt portion 22, that depends downwardly from upper portion 20 and extends away from trunk 12. Similarly, arcuate panel 16 has an upper portion 24 positioned close to trunk 12 and a unitary, outwardly flared skirt portion 26, that depends downwardly from upper portion 24 and extends in a direction away from trunk 12. Likewise, arcuate panel 18 has upper portion 28 and skirt portion 30 unitary with upper portion 28.

The width of the arcuate panels, which together form the tree guard, can be the same or different as required to accommodate the girth of the tree trunk. For example, an array of alternating wider and narrower panels can be fastened around the tree trunk as the tree guard.

The tree trunk protector of Published US Patent Application Number 2012/0151836 requires an assembly of multiple panels.

Moreover, the tree trunk guard of Published US Patent Application Number 2012/0151836 requires the user to select different size panels to accommodate for the girth of the tree trunk.

Lastly, the tree trunk guard of Published US Patent Application Number 2012/0151836 requires a complex fastening system to assemble the tree trunk guard and to accommodate for the girth of the tree trunk.

Thus, it is desirable to provide a tree trunk guard that is a single integral piece.

Moreover, it is desirable to provide a tree trunk guard that is easily adjustable to accommodate for the girth of the tree trunk.

Additionally, it is desirable to provide a tree trunk guard that is a single integral piece and is easily adjustable to accommodate for the girth of the tree trunk.

BRIEF DESCRIPTION OF THE DRAWINGS

The drawings are only for purposes of illustrating various embodiments and are not to be construed as limiting, wherein.

DETAILED DESCRIPTION OF THE DRAWINGS

Figure 1:
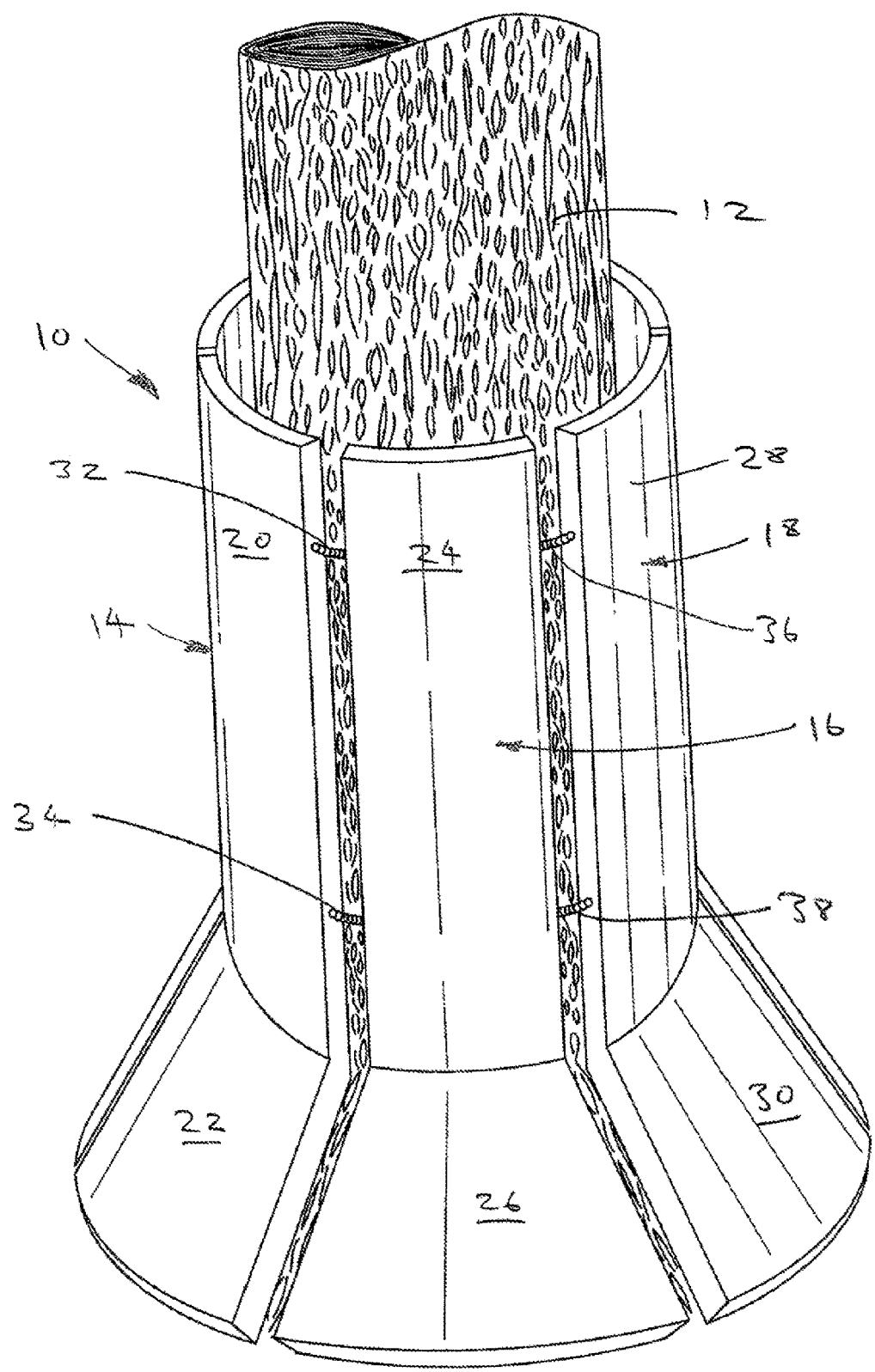
FIG. 1 illustrates a conventional tree trunk guard.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 2:
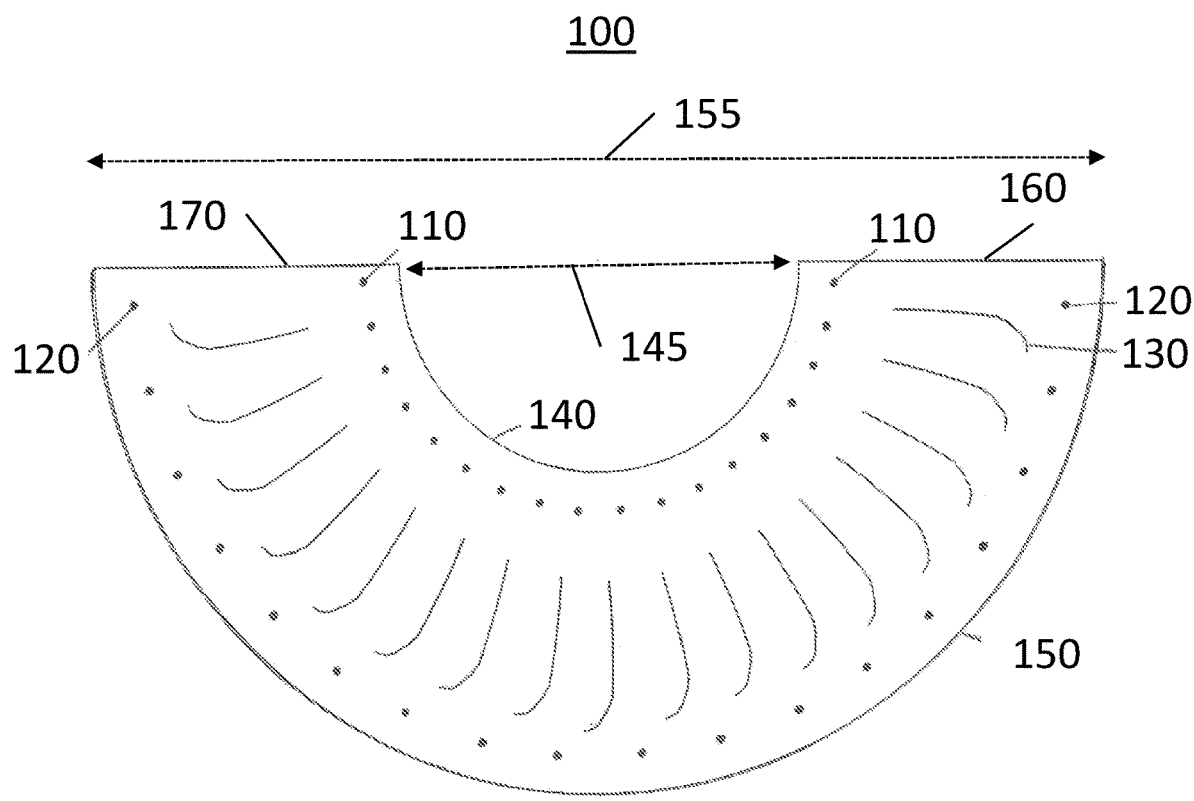
FIG. 2 illustrates an unassembled tree trunk guard.

FIG. 2 illustrates a tree trunk guard 100 from a top viewpoint perspective. As illustrated in FIG. 2, the tree trunk guard 100 is the shape of a semi-circle having a minor semi-circle edge 140 and a major semi-circle edge 150. The minor semi-circle edge 140 has a first diameter 145, and the major semi-circle edge 150 has a second diameter 155. The second diameter 155 is greater (longer) than the first diameter 145. Between the endpoints of the minor semi-circle edge 140 and the major semi-circle edge 150 are edges 160 and 170.

As further illustrated in FIG. 2, along the minor semi-circle edge 140, apex holes 110 are formed to receive fasteners (not shown) to fasten two lined up apex holes 110 together. Along the major semi-circle edge 150, base holes 120 are formed to receive fasteners (not shown) to fasten two lined up base holes 120 together.

Figure 5:
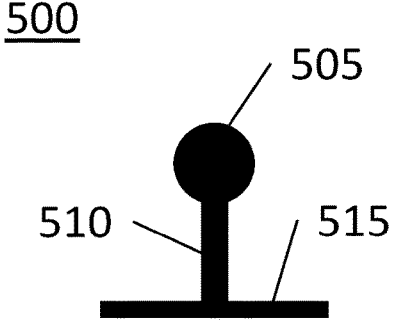
FIG. 5 illustrates an example of a fastener for the tree trunk guard.
Figure 5:
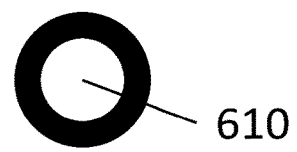
Figure 5:
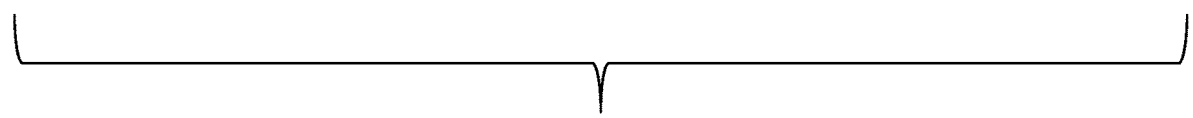

The fasteners may be plastic screws, zip ties, or the rivet system shown in FIG. 5.

Between the minor semi-circle edge 140 and the major semi-circle edge 150, slits, vents, or openings 130 are formed to allow air circulation around the tree trunk when the tree trunk guard 100 is assembled. When tree trunk guard 100 is assembled, the slits, vents, or openings 130 open to allow for air flow through the tree trunk guard 100.

Moreover, when the tree trunk guard 100 is assembled, the tree trunk guard 100 forms a cone-shaped protective guard around the base of the tree with an opening at the apex to provide an air gap between the tree trunk guard 100 and the tree trunk. The base of the assembled cone-shaped tree trunk guard 100 can rest upon the ground.

Figure 3:
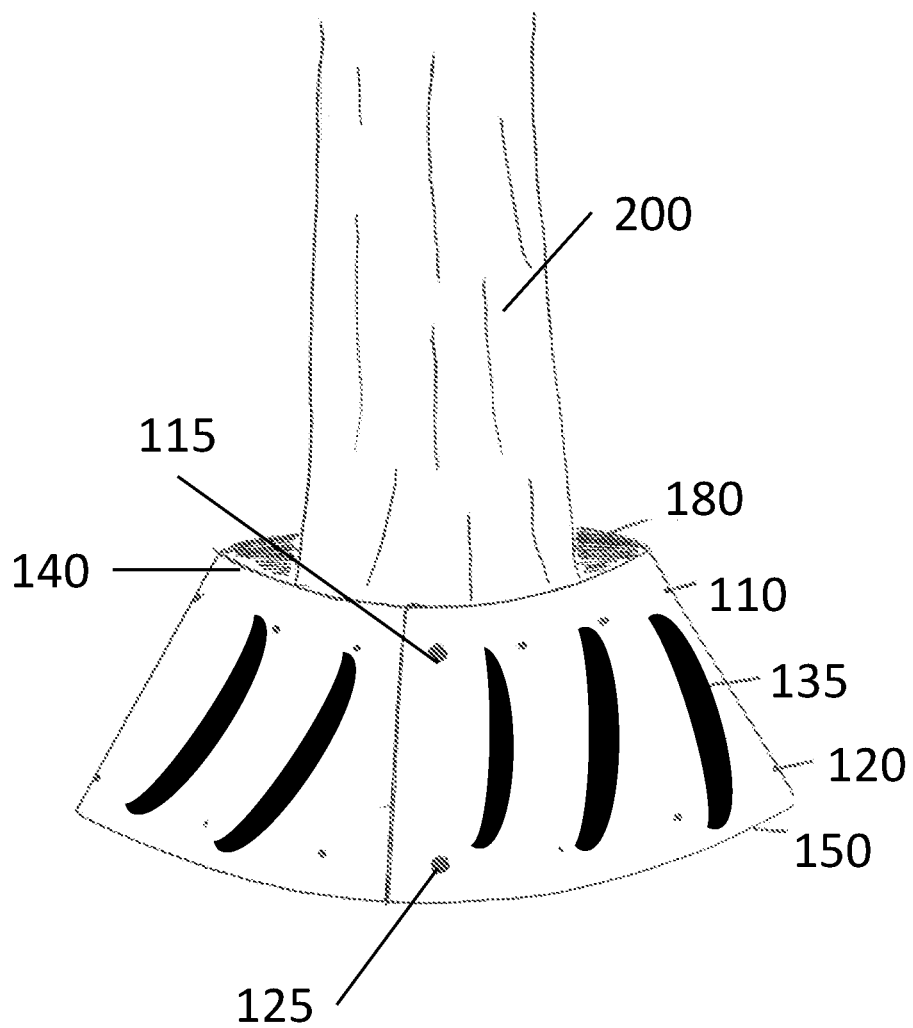
FIG. 3 illustrates the assembled tree trunk guard around a tree trunk.

FIG. 3 illustrates an assembled tree trunk guard around a tree trunk 200. As illustrated in FIG. 3, the tree trunk guard is assembled using fastener 115 to fasten two lined up base holes 110 and fastener 125 to fasten two lined up base holes 120. The resulting assembled tree trunk guard is cone shape.

As illustrated in FIG. 3, the minor semi-circle edge 140 or the top of the tree trunk guard provides space 180 between the tree trunk guard and the trunk of the tree to allow for added air flow and prevent any possible girdling of the tree or wearing on the bark/cambium. The major semi-circle edge 150 or the bottom of the tree trunk guard sits flat on the ground to discourage the presence of pests and block sunlight.

The assembled tree trunk guard also includes open slits, vents, or openings 135 located between the minor semi-circle edge 140 and the major semi-circle edge 150. The open slits, vents, or openings 135 are in an open state, due to the assembled state of the tree trunk guard, to allow for air flow through the tree trunk guard to the tree trunk 200.

Figure 4:
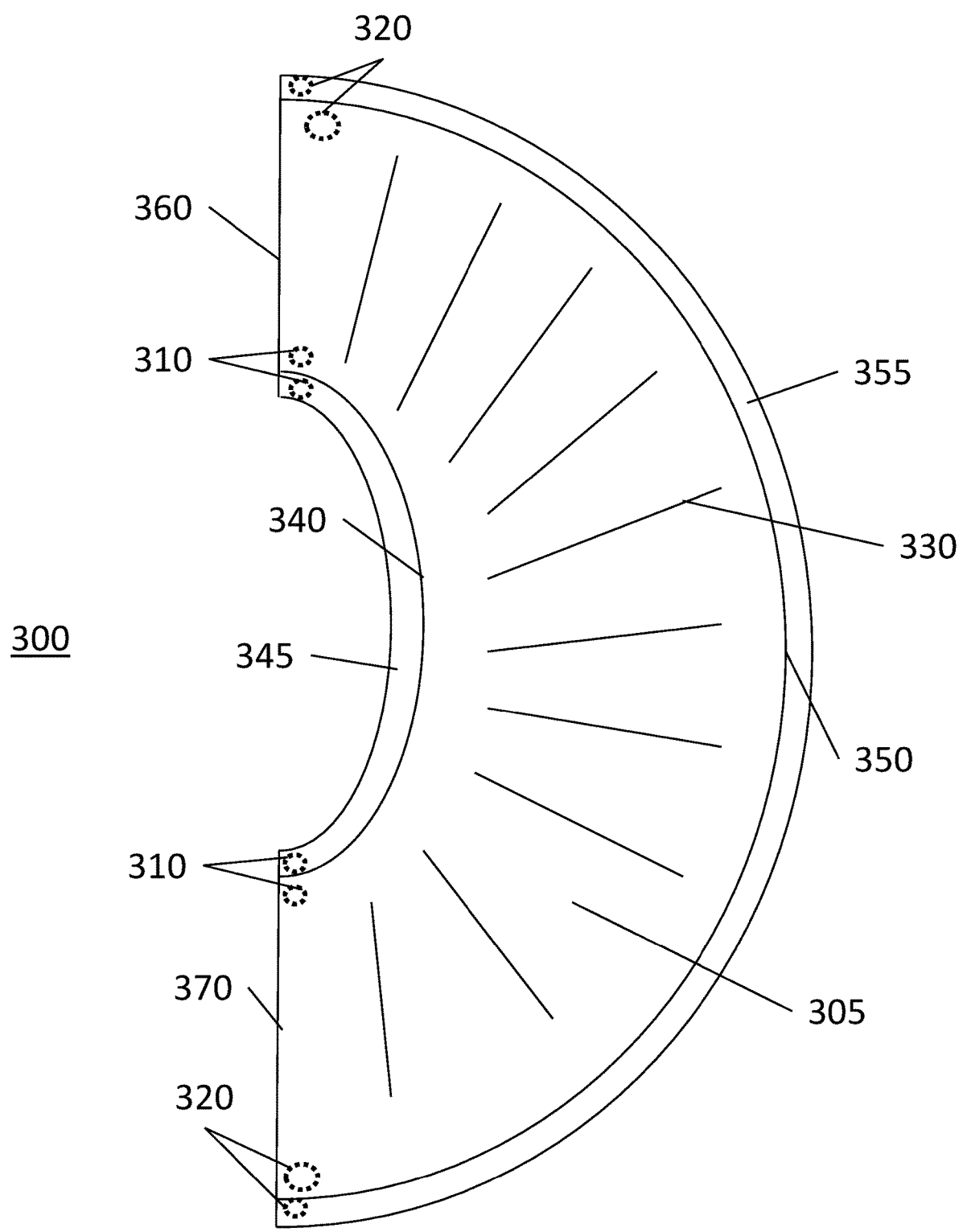
FIG. 4 illustrates another unassembled tree trunk guard.

FIG. 4 illustrates another embodiment of a tree trunk guard 300 from a top view point. As illustrated in FIG. 4, the tree trunk guard 300 is the shape of a semi-circle having a minor semi-circle edge 340 and a major semi-circle edge 350 forming the edges of a middle cone section 305. The minor semi-circle edge 340 has a first diameter associated therewith, and the major semi-circle edge 350 has a second diameter associated therewith. The association of the diameters are similar to the association of the diameters illustrated in FIG. 2. The second diameter is greater (longer) than the first diameter.

The minor semi-circle edge 340 forms an apex boundary between the middle cone section 305 and an apex apron section 345. The thickness of the material making up the apex boundary is less that the thickness of the material making up the middle cone section 305 or the thickness of the material making up the apex apron section 345 such that when the tree trunk guard 300 is assembled, the apex apron section 345 forms a ring around the tree trunk, wherein the planar surface of the apex apron section 345 is substantially parallel to the circumference of the tree trunk, forming an air gap between the apex apron section 345 and the tree trunk.

The major semi-circle edge 350 forms a base boundary between the middle cone section 305 and a base apron section 355. The thickness of the material making up the base boundary is less that the thickness of the material making up the middle cone section 305 or the thickness of the material making up the base apron section 355 such that when the tree trunk guard 300 is assembled, the base apron section 355 forms a ring around the tree trunk, wherein the planar surface of the base apron section 345 is substantially parallel to ground.

Between the endpoints of the minor semi-circle edge 140 and the major semi-circle edge 150 are edges 360 and 370.

As further illustrated in FIG. 4, along the minor semi-circle edge 340, apex holes 310 may be formed to receive fasteners (not shown) to fasten two lined up apex holes 310 together. Optionally, apex holes 310 may be formed in the apex apron section 345 to receive fasteners (not shown) to fasten two lined up apex holes 310 together.

Along the major semi-circle edge 350, base holes 320 are formed to receive fasteners (not shown) to fasten two lined up base holes 320 together. Optionally, base holes 320 may be formed in the base apron section 355 to receive fasteners (not shown) to fasten two lined up base holes 320 together.

The fasteners may be plastic screws, zip ties, or the rivet system shown in FIG. 5.

Between the minor semi-circle edge 340 and the major semi-circle edge 350, slits, vents, or openings 330 are formed to allow air circulation around the tree trunk when the tree trunk guard 300 is assembled. When the tree trunk guard 300 is assembled, the slits, vents, or openings 330 open to allow for air flow through the tree trunk guard 300.

Moreover, when the tree trunk guard 300 is assembled, the tree trunk guard 300 forms a cone-shaped protective guard around the base of the tree with an opening at the apex to provide an air gap between the tree trunk guard 300 and the tree trunk. The base of the assembled cone-shaped tree trunk guard 300 can rest upon the ground.

FIG. 5 illustrates an example of a fastener for the tree trunk guard. As illustrated in FIG. 5, the fastener 400 includes a rivet 500 and a snap ring 600.

The rivet 500 includes a base 515 which has a diameter or width larger than the diameter of the holes in the tree trunk guard. Moreover, the rivet 500 includes a post 510 which has a length slightly longer than the thickness of the material forming the tree trunk guard. Lastly, the rivet 500 includes a retention end 505 configured to engage the snap ring 600.

The snap ring 600 is a ring having an opening 610 configured to engage the retention end 505 of the rivet 500. The outer diameter of the snap ring 600 is larger than the diameter of the holes in the tree trunk guard. The inner diameter of the snap ring 600 is slightly smaller than the diameter of the retention end 505 to hold the rivet 500 in place.

When fastening two holes in the tree trunk guard, the post 510 and retention end 505 are inserted, from one side, through two lined up holes in the tree trunk guard. Upon proper insertion, the snap ring 600 is snapped over the retention end 505, wherein the snap ring 600 is configured to hold the rivet 500 in place.

Figure 6:
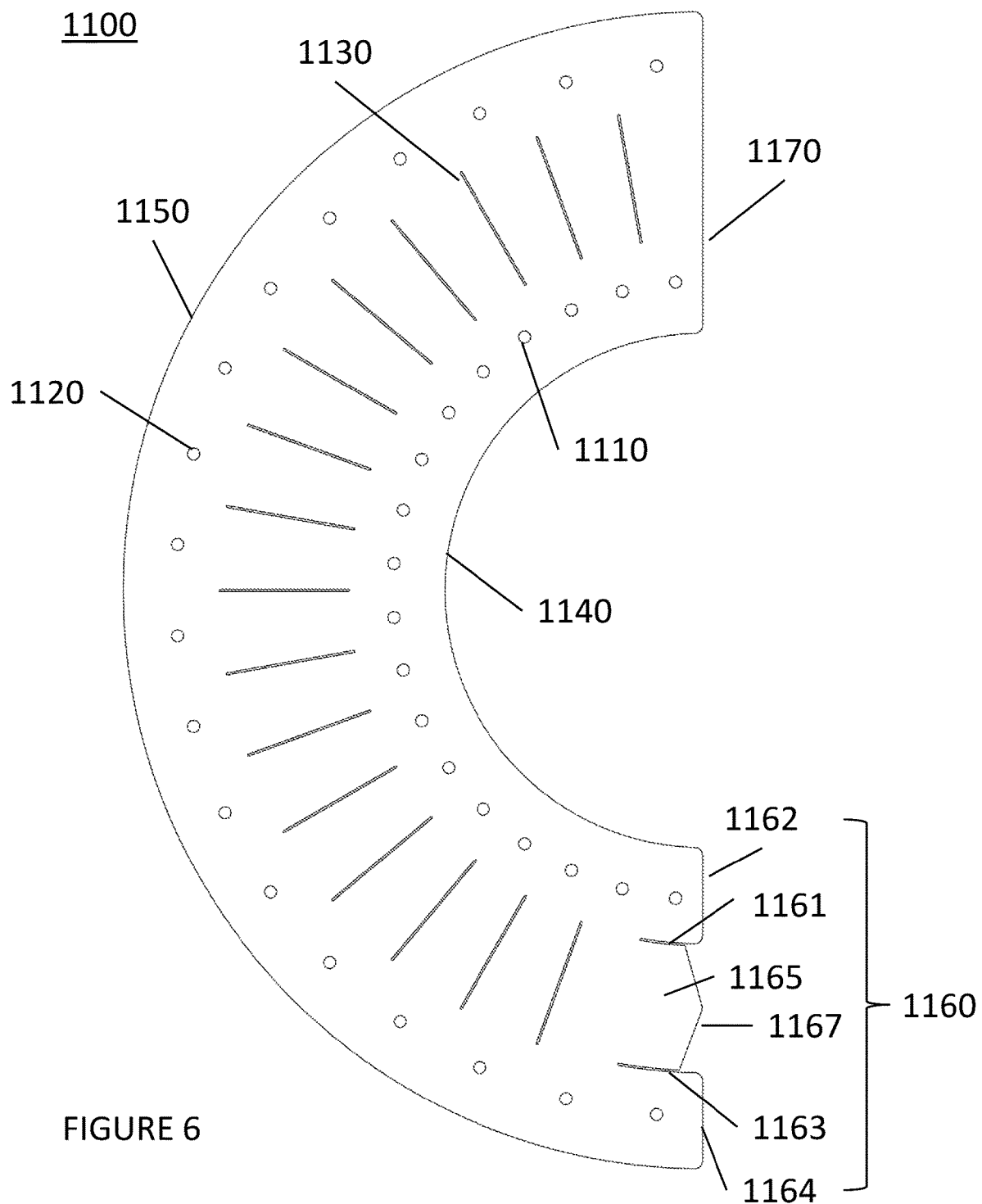
FIG. 6 illustrates another embodiment of an unassembled tree trunk guard.

FIG. 6 illustrates another embodiment of a tree trunk guard 1100 from a top viewpoint perspective. As illustrated in FIG. 6, the tree trunk guard 1100 is the shape of a semi-circle having a minor semi-circle edge 1140 and a major semi-circle edge 1150. The minor semi-circle edge 1140 has a first diameter associated therewith, and the major semi-circle edge 1150 has a second diameter associated therewith. The association of the diameters are similar to the association of the diameters illustrated in FIG. 2. The second diameter is greater (longer) than the first diameter. Between the endpoints of the minor semi-circle edge 1140 and the major semi-circle edge 1150 are edges 1160 and 1170.

As further illustrated in FIG. 6, along the minor semi-circle edge 1140, optional apex holes 1110 are formed to optionally receive fasteners (not shown) to fasten two lined up optional apex holes 1110 together. Along the major semi-circle edge 1150, optional base holes 1120 are formed to optionally receive fasteners (not shown) to fasten two lined up optional base holes 1120 together.

The fasteners may be plastic screws, zip ties, or the rivet system shown in FIG. 5.

Between the minor semi-circle edge 1140 and the major semi-circle edge 1150, slits, vents, or openings 1130 are formed to allow air circulation around the tree trunk and the tree trunk guard 1100 is assembled. When the tree trunk guard 1100 is assembled, the slits, vents, or openings 1130 open to allow for air flow through the tree trunk guard 1100.

As further illustrated in FIG. 6, edge 1160 includes a tab 1165 that is formed by cutting slits 1161 and 1163 in the edge 1160 to form outer projections 1162 and 1164. The slits 1161 and 1163 are substantially perpendicular to the edge 1160. Tab 1165 may include a front edge 1167, wherein a portion or all the front edge 1167 may not be co-linear with the edge 1160. For example, tab 1165 may have a pentagon shape such that the front edge 1167 has an apex shape.

When assembling the tree trunk guard 1100, the tab 1165 is inserted into one of the slits, vents, or openings 1130 to configure the tree trunk guard 1100 to realize an appropriate diameter (volume) to provide protection to the tree trunk and proper ventilation around the tree trunk.

Tab 1165 is used to maintain the tree trunk guard 1100 in the tree trunk guard's assembled state. Optionally, fasteners, plastic screws, zip ties, or a rivet system may be used in conjunction with optional apex holes 1110 and optional base holes 1120 to assist in maintaining the tree trunk guard 1200 in the tree trunk guard's assembled state.

Moreover, when the tree trunk guard 1100 is assembled, the tree trunk guard 1100 forms a cone-shaped protective guard around the base of the tree with an opening at the apex to provide an air gap between the tree trunk guard 1100 and the tree trunk. The base of the assembled cone-shaped tree trunk guard 1100 can rest upon the ground.

Figure 7:
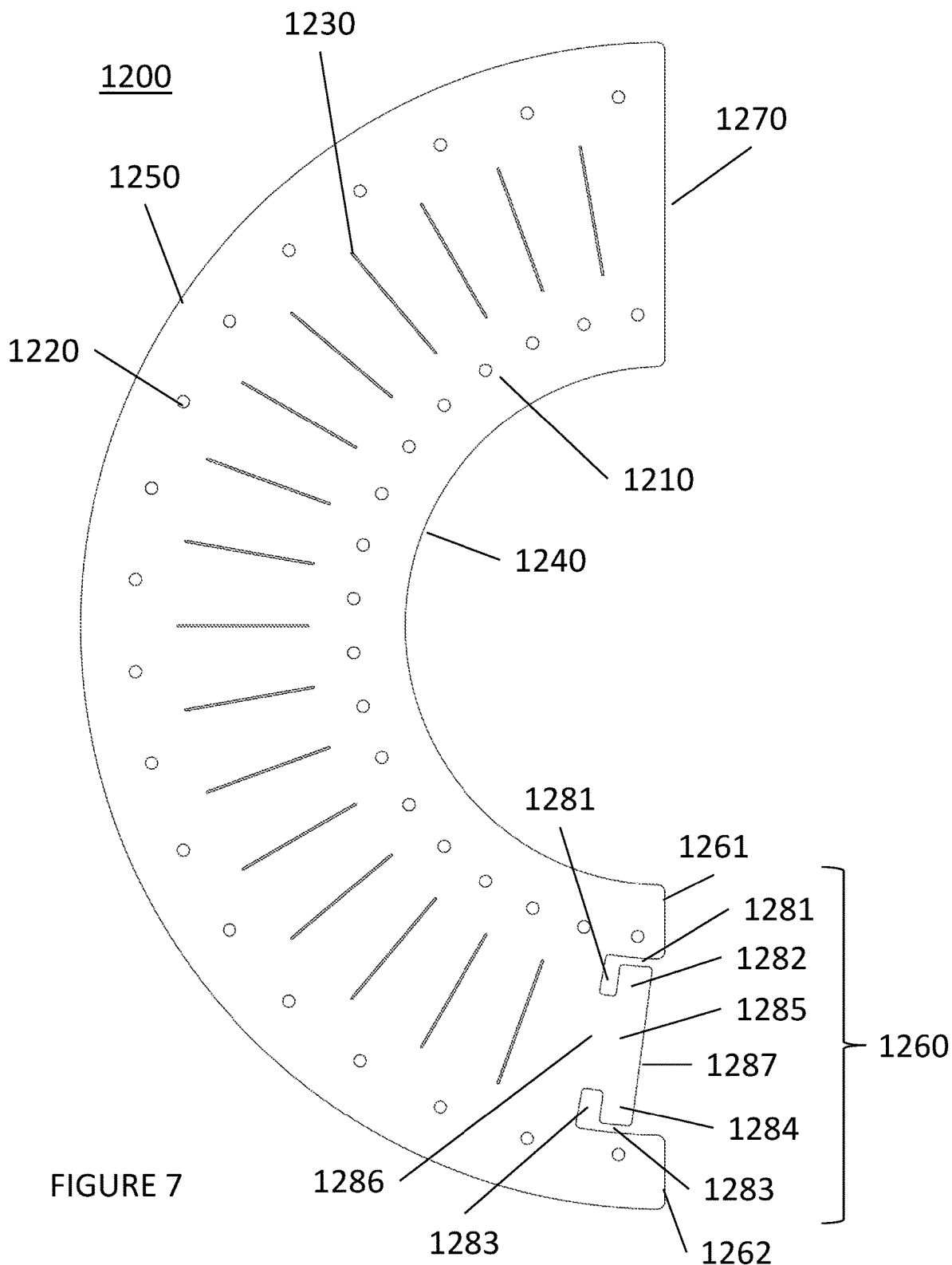
FIG. 7 illustrates another embodiment of an unassembled tree trunk guard.

FIG. 7 illustrates another embodiment of a tree trunk guard 1200 from a top viewpoint perspective. As illustrated in FIG. 7, the tree trunk guard 1200 is the shape of a semi-circle having a minor semi-circle edge 1240 and a major semi-circle edge 1250. The minor semi-circle edge 1240 has a first diameter associated therewith, and the major semi-circle edge 1250 has a second diameter associated therewith. The association of the diameters are similar to the association of the diameters illustrated in FIG. 2. The second diameter is greater (longer) than the first diameter. Between the endpoints of the minor semi-circle edge 1240 and the major semi-circle edge 1250 are edges 1260 and 1270.

As further illustrated in FIG. 7, along the minor semi-circle edge 1240, optional apex holes 1210 are formed to optionally receive fasteners (not shown) to fasten two lined up optional apex holes 1210 together. Along the major semi-circle edge 1250, optional base holes 1220 are formed to optionally receive fasteners (not shown) to fasten two lined up optional base holes 1220 together.

The fasteners may be plastic screws, zip ties, or the rivet system shown in FIG. 5.

Between the minor semi-circle edge 1240 and the major semi-circle edge 1250, slits, vents, or openings 1230 are formed to allow air circulation around the tree trunk and the tree trunk guard 1200 is assembled. When the tree trunk guard 1200 is assembled, the slits, vents, or openings 1230 open to allow for air flow through the tree trunk guard 1200.

As further illustrated in FIG. 7, edge 1260 includes a T-shaped tab 1287 that is formed by cutting L-shaped groves 1281 and 1283 in the edge 1260, wherein L-shaped groves 1281 and 1283 are configured to form auxiliary tabs 1282 and 1284. The T-shaped tab 1287 includes crossmember 1285 and a projecting member 1286. The L-shaped groves 1281 and 1283 are also configured to form outer projections 1261 and 1262.

The auxiliary tabs 1282 and 1284 are projections from the crossmember 1285. The auxiliary tabs 1282 and 1284 are substantially parallel to a front edge of the T-shaped tab 1287. It is noted that a portion or all of the front edge of the T-shaped tab 1287 may not be co-linear with front edges of outer projections 1261 and 1262.

When assembling the tree trunk guard 1200, the T-shaped tab 1287, with auxiliary tabs 1282 and 1284, are inserted into one of the slits, vents, or openings 1230 to configure the tree trunk guard 1200 to realize an appropriate diameter (volume) so as to provide protection to the tree trunk and proper ventilation around the tree trunk.

The auxiliary tabs 1282 and 1284 provide a locking mechanism to maintain the tree trunk guard 1200 in the tree trunk guard's assembled state. Optionally, fasteners, plastic screws, zip ties, or a rivet system may be used in conjunction with optional apex holes 1210 and optional base holes 1220 to assist in maintaining the tree trunk guard 1200 in the tree trunk guard's assembled state.

Moreover, when the tree trunk guard 1200 is assembled, the tree trunk guard 1200 forms a cone-shaped protective guard around the base of the tree with an opening at the apex to provide an air gap between the tree trunk guard 1200 and the tree trunk. The base of the assembled cone-shaped tree trunk guard 1200 can rest upon the ground.

Figure 8:
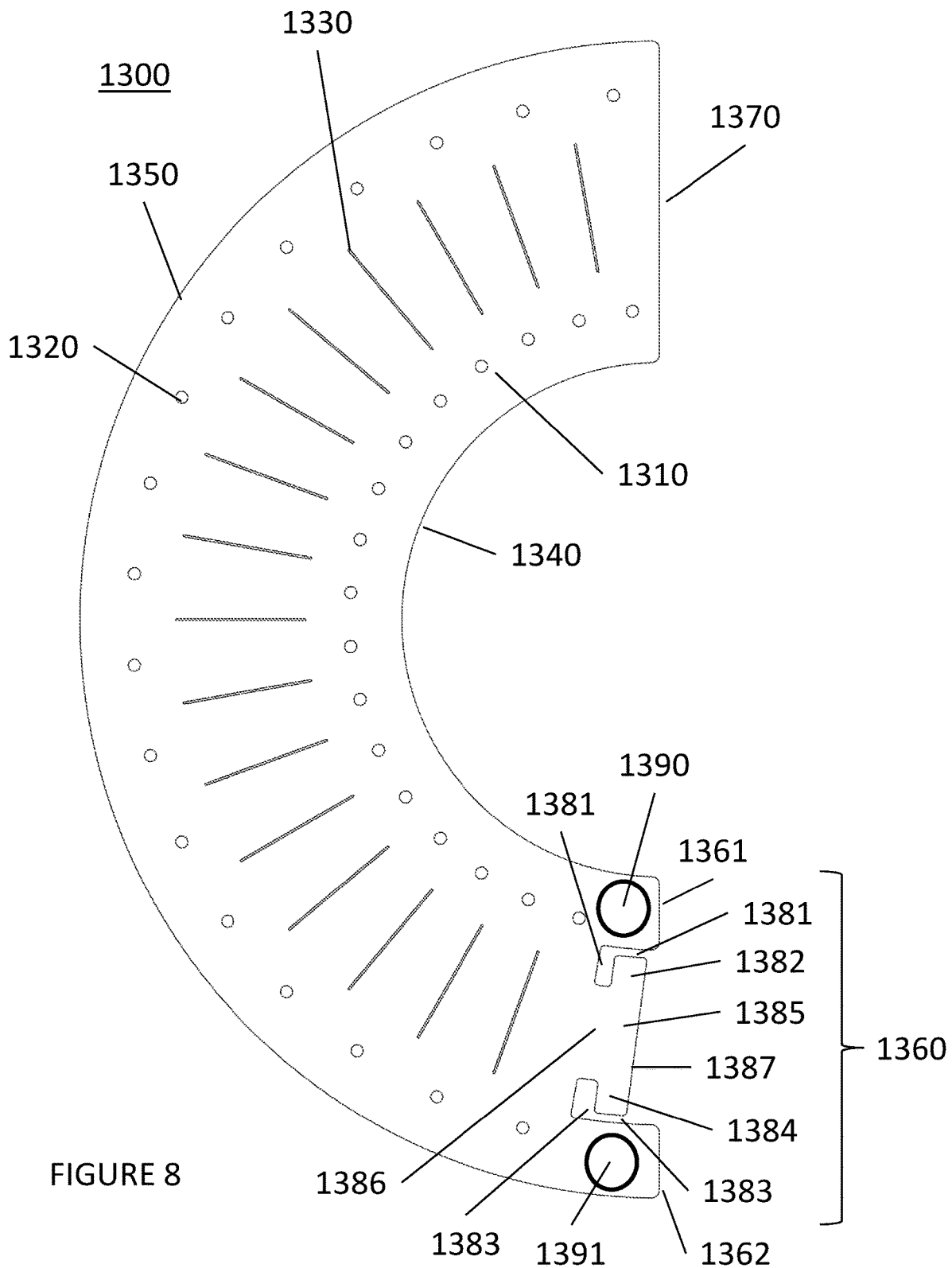
FIG. 8 illustrates another embodiment of an unassembled tree trunk guard.

FIG. 8 illustrates another embodiment of a tree trunk guard 1300 from a top viewpoint perspective. As illustrated in FIG. 8, the tree trunk guard 1300 is the shape of a semi-circle having a minor semi-circle edge 1340 and a major semi-circle edge 1350. The minor semi-circle edge 1340 has a first diameter associated therewith, and the major semi-circle edge 1350 has a second diameter associated therewith. The association of the diameters are similar to the association of the diameters illustrated in FIG. 2. The second diameter is greater (longer) than the first diameter. Between the endpoints of the minor semi-circle edge 1340 and the major semi-circle edge 1350 are edges 1360 and 1370.

As further illustrated in FIG. 8, along the minor semi-circle edge 1340, apex holes 1310 are formed to receive fastener 1390 to fasten two lined up optional base holes 1310 together. Along the major semi-circle edge 1350, base holes 1320 are formed to receive fastener 1391 to fasten two lined up optional base holes 1320 together.

Between the minor semi-circle edge 1340 and the major semi-circle edge 1350, slits, vents, or openings 1330 are formed to allow air circulation around the tree trunk and the tree trunk guard 1300 is assembled. When the tree trunk guard 1300 is assembled, the slits, vents, or openings 1330 open to allow for air flow through the tree trunk guard 1300.

As further illustrated in FIG. 8, edge 1360 includes a T-shaped tab 1387 that is formed by cutting L-shaped groves 1381 and 1383 in the edge 1360, wherein L-shaped groves 1381 and 1383 are configured to form auxiliary tabs 1382 and 1384. The T-shaped tab 1387 includes crossmember 1385 and a projecting member 1386. The L-shaped groves 1381 and 1383 are also configured to form outer projections 1361 and 1362. It is noted that fastener 1390 and fastener 1391 may be molded with the outer projections 1361 and 1362, respectively, such that fastener 1390 and fastener 1391 are integral with outer projections 1361 and 1362, respectively.

The auxiliary tabs 1382 and 1384 are projections from the crossmember 1385. The auxiliary tabs 1382 and 1384 are substantially parallel to a front edge of the T-shaped tab 1387. It is noted that a portion or all of the front edge of the T-shaped tab 1387 may not be co-linear with front edges of outer projections 1361 and 1362.

When assembling the tree trunk guard 1300, the T-shaped tab 1387, with auxiliary tabs 1382 and 1384, are inserted into one of the slits, vents, or openings 1330 to configure the tree trunk guard 1300 to realize an appropriate diameter (volume) to provide protection to the tree trunk and proper ventilation around the tree trunk.

The auxiliary tabs 1382 and 1384 provide a locking mechanism to maintain the tree trunk guard 1300 in the tree trunk guard's assembled state. Also, fasteners 1390 and 1391 are used in conjunction with apex holes 1310 and base holes 1320, respectively, to assist in maintaining the tree trunk guard 1300 in the tree trunk guard's assembled state.

Moreover, when the tree trunk guard 1300 is assembled, the tree trunk guard 1300 forms a cone-shaped protective guard around the base of the tree with an opening at the apex to provide an air gap between the tree trunk guard 1300 and the tree trunk. The base of the assembled cone-shaped tree trunk guard 1300 can rest upon the ground.

Figure 9:
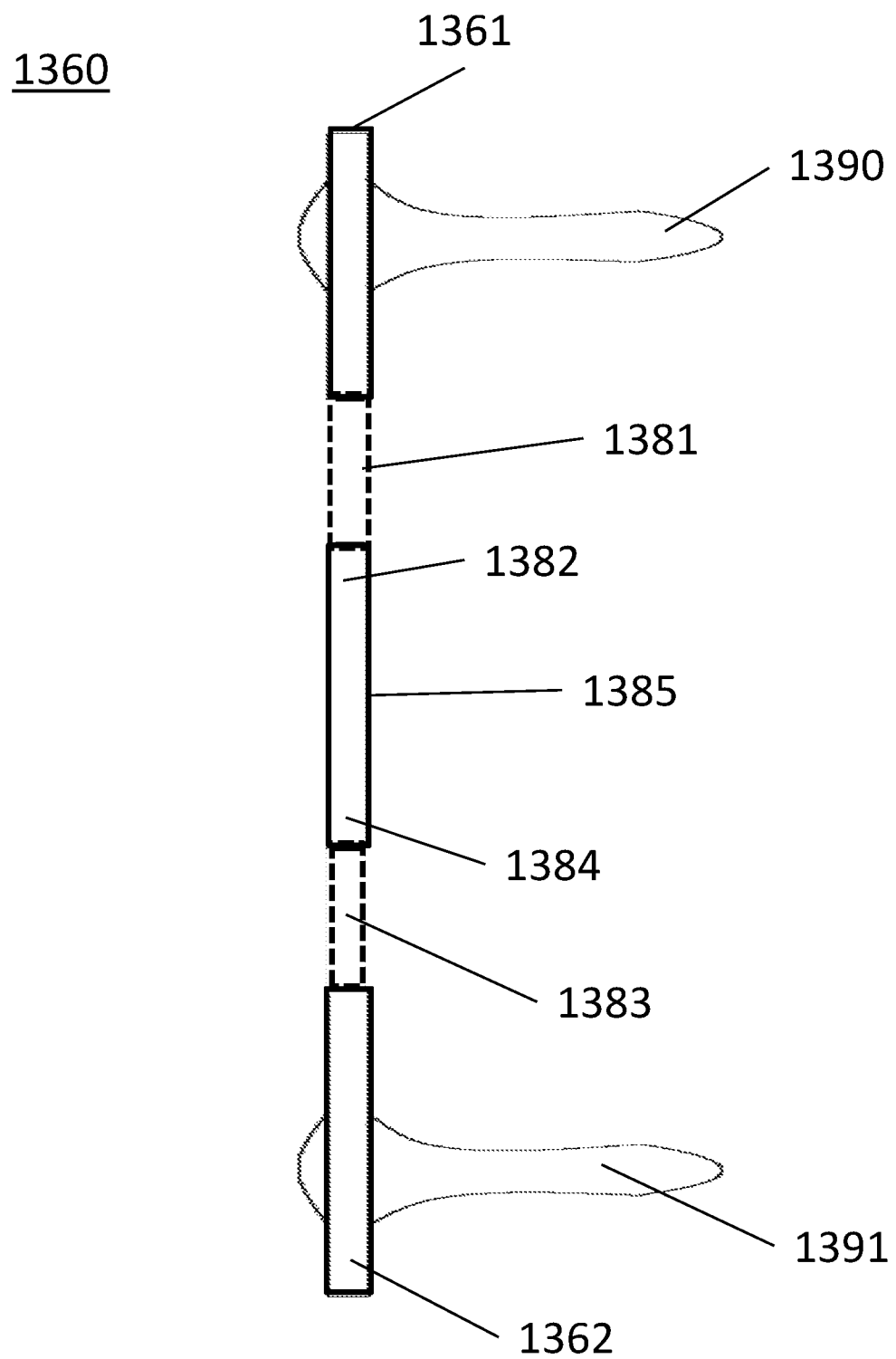
FIG. 9 illustrates a side view of a rivet end of the embodiment illustrated in FIG. 8.

FIG. 9 illustrates a side view of edge 1360 of FIG. 8. As illustrated in FIG. 9, edge 1360 includes a T-shaped tab that is formed by cutting L-shaped groves 1381 and 1383 in the edge 1360, wherein L-shaped groves 1381 and 1383 are configured to form auxiliary tabs 1382 and 1384. The T-shaped tab includes crossmember 1385. The L-shaped groves 1381 and 1383 are also configured to form outer projections 1361 and 1362, which include fastener 1390 and fastener 1391, respectively. It is noted that fastener 1390 and fastener 1391 may be molded with the outer projections 1361 and 1362, respectively, such that fastener 1390 and fastener 1391 are integral with outer projections 1361 and 1362, respectively.

The auxiliary tabs 1382 and 1384 are projections from the crossmember 1385.

It is noted that the fasteners can be configured in any shape that will hold two lined holes in the tree trunk guard in place.

It is also noted that the holes in the tree trunk guard are fastening sites and that the holes could be replaced with integral rivets or other fastening devices.

As described above, the tree trunk guard is adjustable guard to be placed at the bottom of a tree to protect it from damage.

The tree trunk guard can also serve the purpose of replacing the need for mulch by blocking weeds and retaining soil moisture.

The tree trunk guard may be made from a thin, flexible plastic that can wrap around the base of the tree at soil level.

The tree trunk guard has two rows of fastening sites in concentric circles that allow for the tree trunk guard to be attached at two points by either plastic plugs, zip ties, rivets, or other fastening devices.

Slits, vents, or openings in the tree trunk guard allow for air flow intended to prevent the buildup of moisture on the trunk of the tree while preventing sunlight from reaching the soil while preserving soil moisture. The air flow to the soil and trunk of the tree prevents mold growth and rot.

The geometry of the tree trunk guard allows for easy change in sizing to fit larger or smaller trees. The fit is meant to be such that the top of the tree trunk guard can be adjusted to avoid contact with the trunk of the tree to allow for more air flow and also prevent insects from living in the space between the tree and the tree trunk guard.

The tree trunk guard may be low profile.

Lastly, the configuration of the unassembled tree trunk guard lends itself to being produced from a single piece of plastic and easily transported flat.

A tree trunk guard comprises a guard member; the guard member being configured as a semi-circle shape; the guard member including a minor semi-circle edge having a first minor semi-circle edge endpoint and a second minor semi-circle edge endpoint, a major semi-circle edge having a first major semi-circle edge endpoint and a second major semi-circle edge endpoint, a first edge configured to be positioned between the first minor semi-circle edge endpoint and the first major semi-circle edge endpoint, and a second edge configured to be positioned between the second minor semi-circle edge endpoint and the second major semi-circle edge endpoint; the guard member including a plurality of apex holes formed along the minor semi-circle edge, each apex hole being configured to receive a fastener; the guard member including a plurality of base holes formed along the major semi-circle edge, each base hole being configured to receive a fastener; the guard member including openings formed between the minor semi-circle edge and the major semi-circle edge, the openings being configured to open when the tree trunk guard is assembled; the minor semi-circle edge having a first diameter associated therewith; the major semi-circle edge having a second diameter associated therewith; the second diameter being greater than the first diameter.

The minor semi-circle edge may be configured to provide an air gap between the tree trunk guard and a tree trunk when the tree trunk guard is assembled.

One of the plurality of apex holes may be configured to line up another apex hole when the tree trunk guard is assembled.

One of the plurality of base holes may be configured to line up another base hole when the tree trunk guard is assembled.

The first edge may be configured to include a tab formed by slits in the first edge; the first edge including a first outer projection and a second outer projection formed by the slits in the first edge; the tab being configured to engage one of the plurality of openings.

The tab may be pentagon shaped.

The first edge may be configured to include a T-shaped tab formed by L-shaped grooves in the first edge; the first edge including a first outer projection and a second outer projection formed by the L-shaped grooves in the first edge; the T-shaped tab being configured to engage one of the plurality of openings.

The first outer projection may have a first fastener formed therein and the second outer projection may have a second fastener formed therein; the first fastener being configured to engage one of the plurality of apex holes; the second fastener being configured to engage one of the plurality of base holes.

It will be also appreciated that variations of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:
1. A tree trunk guard comprising:
a guard member;
said guard member being configured as a semi-circle shape;
said guard member including
a minor semi-circle edge having a first minor semi-circle edge endpoint and a second minor semi-circle edge endpoint,
a major semi-circle edge having a first major semi-circle edge endpoint and a second major semi-circle edge endpoint,
a first edge configured to be positioned between said first minor semi-circle edge endpoint and said first major semi-circle edge endpoint, and
a second edge configured to be positioned between said second minor semi-circle edge endpoint and said second major semi-circle edge endpoint;
said guard member including openings formed between said minor semi-circle edge and said major semi-circle edge, said openings being configured to open when the tree trunk guard is assembled;
said minor semi-circle edge having a first diameter associated therewith;

said major semi-circle edge having a second diameter associated therewith;
said second diameter being greater than said first diameter;
said first edge including slits formed therein;
said slits in said first edge forming a first outer projection, a second outer projection, and an inner projection formed between said first outer projection and said second outer projection;
said slits configured to detach said first outer projection from said inner projection and to detach said second outer projection from said inner projection;
said inner projection being configured to engage one of said plurality of openings.

2. The tree trunk guard as claimed in claim 1, wherein said minor semi-circle edge being configured to provide an air gap between the tree trunk guard and a tree trunk when the tree trunk guard is assembled.

3. The tree trunk guard as claimed in claim 1, wherein said guard member includes a plurality of apex holes formed along said minor semi-circle edge, each apex hole being configured to receive a fastener;
one of said plurality of apex holes is being configured to line up with another apex hole when the tree trunk guard is assembled.

4. The tree trunk guard as claimed in claim 3, wherein said guard member includes a plurality of base holes formed along said major semi-circle edge, each base hole being configured to receive a fastener;
one of said plurality of base holes being configured to line up with another base hole when the tree trunk guard is assembled.

5. The tree trunk guard as claimed in claim 1, wherein said inner projection is pentagon shaped.

6. A tree trunk guard comprising:
a guard member;
said guard member being configured as a semi-circle shape;
said guard member including
    a minor semi-circle edge having a first minor semi-circle edge endpoint and a second minor semi-circle edge endpoint,
    a major semi-circle edge having a first major semi-circle edge endpoint and a second major semi-circle edge endpoint,
    a first edge configured to be positioned between said first minor semi-circle edge endpoint and said first major semi-circle edge endpoint, and
    a second edge configured to be positioned between said second minor semi-circle edge endpoint and said second major semi-circle edge endpoint;
said guard member including openings formed between said minor semi-circle edge and said major semi-circle edge, said openings being configured to open when the tree trunk guard is assembled;
said minor semi-circle edge having a first diameter associated therewith;
said major semi-circle edge having a second diameter associated therewith;
said second diameter being greater than said first diameter;
said first edge including L-shaped grooves formed therein;
said L-shaped grooves in said first edge forming a first outer projection, a second outer projection, and a T-shaped tab formed between said first outer projection and said second outer projection;
said T-shaped tab being configured to engage one of said plurality of openings;
said L-shaped grooves configured to detach said first outer projection from said T-shaped tab and to detach said second outer projection from said T-shaped tab.

7. The tree trunk guard as claimed in claim 6, wherein said minor semi-circle edge being configured to provide an air gap between the tree trunk guard and a tree trunk when the tree trunk guard is assembled.

8. The tree trunk guard as claimed in claim 6, wherein said guard member includes a plurality of apex holes formed along said minor semi-circle edge, each apex hole being configured to receive a fastener;
one of said plurality of apex holes being configured to line up with another apex hole when the tree trunk guard is assembled.

9. The tree trunk guard as claimed in claim 6, wherein said guard member includes a plurality of base holes formed along said major semi-circle edge, each base hole being configured to receive a fastener;
one of said plurality of base holes is being configured to line up with another base hole when the tree trunk guard is assembled.

10. The tree trunk guard as claimed in claim 4, wherein said first outer projection has a first fastener formed therein and said second outer projection has a second fastener formed therein;
said first fastener being configured to engage one of said plurality of apex holes;
said second fastener being configured to engage one of said plurality of base holes.

* * * * *